United States Patent [19]

Syverson

[11] 4,217,117
[45] Aug. 12, 1980

[54] FILTER BAG SUPPORT FOR MULTIPLE BAG FILTERS

[75] Inventor: Leonard M. Syverson, Upper St. Clair, Pa.

[73] Assignee: Wheelabrator-Frye Inc., Hampton, N.H.

[21] Appl. No.: 916,479

[22] Filed: Jun. 19, 1978

[51] Int. Cl.$^2$ ............................................. B01D 46/04
[52] U.S. Cl. ................... 55/304; 55/341 NT; 55/378; 55/508; 248/327
[58] Field of Search ................... 55/304, 341 NT, 378, 55/508; 248/327; 210/332, 407

[56] References Cited

U.S. PATENT DOCUMENTS

| 519,593 | 5/1894 | Seaberg ............................ 248/327 |
| 833,068 | 10/1906 | Lloyd ............................ 248/327 X |
| 1,835,093 | 12/1931 | Ruemelin ............................ 55/378 X |
| 2,014,298 | 9/1935 | Schneible ............................ 55/304 |
| 2,137,254 | 11/1938 | Turnbull ............................ 55/304 |
| 2,830,676 | 4/1958 | Schneider ............................ 55/304 |
| 3,097,939 | 7/1963 | Schneider et al. ............................ 55/304 X |
| 3,550,358 | 12/1970 | McCabe ............................ 55/341 NT X |
| 3,881,673 | 5/1975 | Peterson ............................ 55/378 X |
| 4,023,943 | 5/1977 | Kipple et al. ............................ 55/304 |
| 4,123,027 | 10/1978 | Huntington ............................ 55/378 X |

*Primary Examiner*—Kathleen J. Prunner
*Attorney, Agent, or Firm*—McDougall, Hersh & Scott

[57] ABSTRACT

Means for mounting a filter bag in a multiple filter bag assembly with means for maintaining the bag under tension while permitting transmission of shaking motion from a shaker mechanism to the tensioned filter bag, in which use is made of a shaker bar suspended for freedom of movement in a crosswise direction and having retainer plates through which tensioned hanger rods for the bags extend for relative vertical movement with means for actuating the shaker bar for movement in the cross direction and tensioning means connecting the hanger rods to a support.

7 Claims, 3 Drawing Figures

FILTER BAG SUPPORT FOR MULTIPLE BAG FILTERS

This invention relates to a filter apparatus for the removal of dust, dirt and other particulate from air or other gaseous medium and it relates more particularly to a dust collector which makes use of a plurality of fabric filter elements through which the dust or dirt laden air or other gaseous medium is advanced for filtering out the dust or dirt particles as the air or other gaseous medium passes on through.

This invention is addressed to a filter device of the type described in U.S. Pat. Nos. 2,143,664, 2,879,863, and 2,932,362, wherein the upper ends of a plurality of elongate tubular members of a filter fabric are suspended from hanger rods while the open bottom ends of the tubular members are secured, as by collars, about openings through a cell plate for passage of the dust or dirt laden air or other gaseous medium from an inlet plenum chamber into the tubular members for filtration during passage therethrough.

When the accumulation of dirt or dust separated from the air or other gaseous medium onto the ingoing side of the filter fabric becomes so excessive as to interfere with the efficiency and operation of the device, it becomes necessary to clean the tubes by removal of the filter cake formed by the dust or dirt particles on the walls of the filter fabric. For this purpose, the flow of dirt or dust laden air into the inlet plenum chamber is temporarily discontinued while the filter tubes are vigorously shaken to loosen the separated dust and dirt accumulated as a layer on the ingoing side of the filter fabric. The separated filter cake falls gravitationally downwardly through the open ends of the filter tubes into a hopper through which the collected dust and dirt can be removed from the apparatus.

As described in the aforementioned patents, the tubular members of filter fabric are suspended from hooks or hanger rods which are secured to a shaker mechanism for whipping the fabric filter tubes to loosen the filter cake.

While means are provided initially to mount the fabric filter tubes with considerable tension between the tube hook at one end and the cell plate at the other, after a number of cleaning cycles, such tensioned relationship dissipates, perhaps due to a certain amount of stretch in the filter fabric or otherwise. As a result, the fabric filter tubes become loosely held in the filter device with the result that the filter tubes become subject to disengagement from their supports, and transfer of the shaking motion for cleaning the tubes becomes less effective.

It is an object of this invention to provide a means for mounting and supporting the elongate fabric filter tubes of the type described under a tensioned relationship and in which the desired tensioned relationship is maintained substantially continuously throughout the period of use, independent of the extent of use or the number of cleaning cycles to which filter tubes have been subjected, and whereby such tensioned relationship can be established in a simple and efficient manner at the time that the fabric filter tube is mounted in position of use.

It is a further object of this invention to provide a means for support of the elongate fabric filter tubes in which such support means comprise a relatively small number of elements which can be easily and quickly assembled to provide a means from which the filter tubes can be suspended which embodies means for support of the filter tubes under tension and with means for adjustment of the amount of tension on the suspended filter tubes, which provides means for maintaining the desired tensioned relationship while the filter tube is in position of use in the filter apparatus, and in which the shaking mechanism is flexibly supported for movement independent of the support for the filter tubes yet interconnected in a manner to transmit reciprocating movement of the shaker mechanism to the filter tube supports for shaking the filter tubes suspended therefrom.

These and other objects and advantages of this invention will hereinafter appear and for purposes of illustration, but not of limitation, an embodiment of the invention is shown in the accompanying drawings in which.

Figure 1:
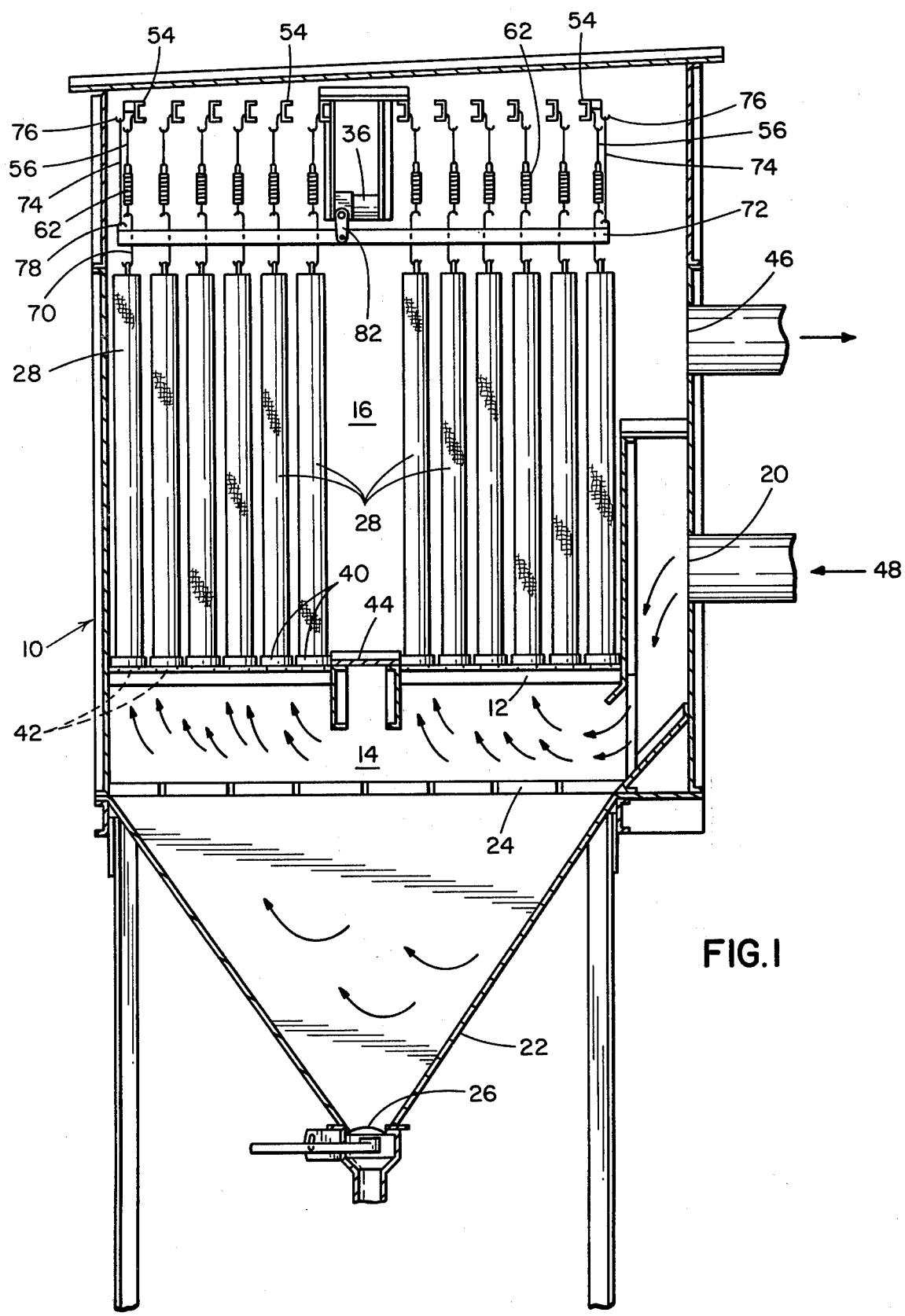
FIG. 1 is an elevational view of a filter device embodying the features of this invention.

Referring now to the drawings, the numeral 10 indicates a housing having a cell plate 12 which separates the housing into a lower inlet plenum chamber 14 and a bag house 16. The inlet plenum chamber 14 communicates with an inlet opening 20 through which dirt or dust laden gaseous medium, such as air, is introduced into the dust collector. Immediately below the inlet phenum chamber, there is provided a hopper 22, separated from the inlet plenum chamber by an open grating 24. A passage having a removable door 26 is provided in the bottom of the hopper for the removal of dust or dirt collected therein.

In the bag house 16, there is provided at least one and preferably a plurality of elongate filter tubes 28 formed of a pervious, flexible filter fabric. The lower ends of the filter tubes 28 are engaged onto rings or collars 40 releasably to secure the open ends of the filter tubes in communication with the openings 42 through the cell plate 12. The upper ends of each of the filter tubes 28 are releasably suspended from means embodying the features of this invention to support the filter tubes in a desired tensioned relation while providing means to shake the suspended filter tubes for release of the filter cake.

The filter tubes 28, in the bag house 16, may be divided into separate compartments, as illustrated in FIG. 1 of the drawings, with a walkway 44 in between to enable access for inspection or replacement of the filter tubes. In a modification of the type described, one or more of the groups of tubes can be "on stream" for filtration while another group is involved in a cleaning cycle thereby to maintain a substantially continuous filtering operation. The bag house 16 is provided with an outlet opening 46 for release of the filtered air or gas for discharge into the atmosphere or for other use.

In operation, dirt or dust laden air 48 is drawn into the housing 10 through the inlet opening 20 into the inlet plenum chamber 14. From the inlet phenum chamber, the dirt or dust laden gas flows through the openings in the cell plate and into the interior of the fabric filter tubes in communication therewith. The particles of dirt, dust or other particulate filter out on the ingoing side of the filter fabric as the gas flows through the tubes into the clean air plenum chamber and out through the outlet opening 46.

After a period of time, the amount of dust, dirt, or other particulate collected as a filter cake on the ingoing side of the filter tubes 28, is sufficient to raise the pressure drop across the filter surface whereby the filtering operation becomes less efficient from the standpoint of power requirements or throughput of air or gas to be treated. When this occurs, the tube section is removed from the normal filter cycle and is subjected to a cleaning cycle. For this purpose, the tubes are shaken by a shaking mechanism that operates to whip the tubes back and forth to loosen the filter cake. The separated filter cake falls gravitationally through the openings 42 into the hopper 22, from which the collected dust and dirt can be removed. After the brief period of time for accomplishing the cleaning cycle, the tube section is returned on stream in the normal filter cycle.

The concepts of this invention have to do with the combination of means for tensioned support of the filter tubes and the independent support of the shaker mechanism to enable relative adjustment of the tube support while actuating the latter for imparting the desired shaking action to the filter tubes suspended therefrom.

Figure 2:
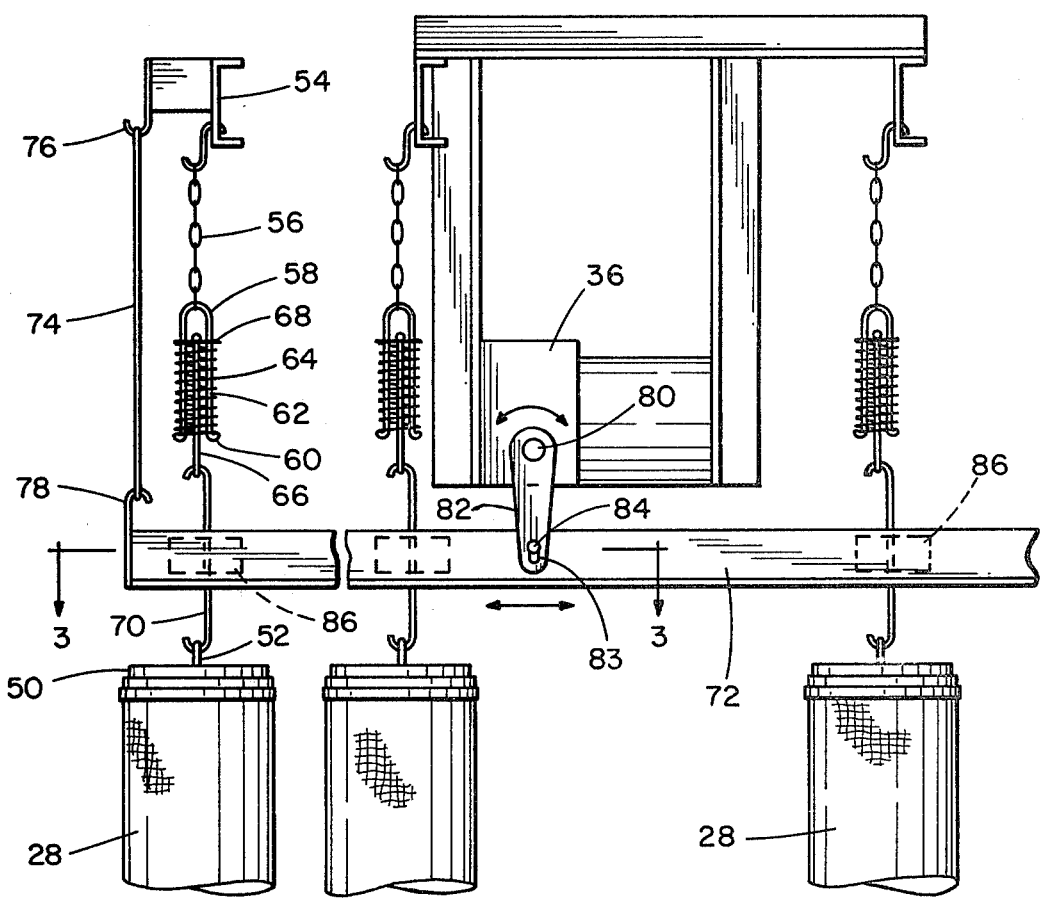
FIG. 2 is an enlarged elevational view showing the support for the shaker mechanism and for mounting the filter tubes in their assembled relation in accordance with the practice of this invention.
Figure 3:
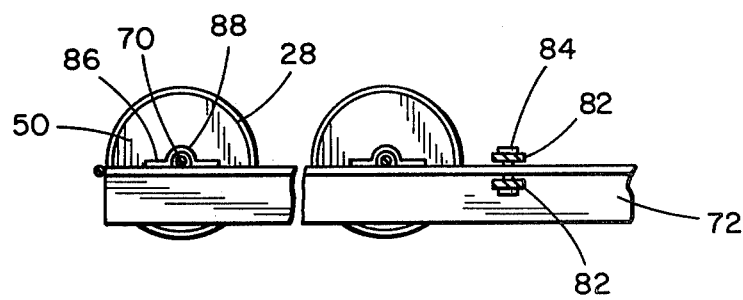
FIG. 3 is a sectional view taken along the line 3—3 of FIG. 2.

As illustrated in FIGS. 2 and 3, the upper ends of each of the filter tubes 28 are secured to a filter tube cap 50 provided with a stirrup 52 which extends upwardly from the central portion of the cap.

A structural support, fixed in the housing, embodies means such as a hook or bracket 54 for engagement by a link chain 56. An inverted U-shaped bolt 58 is secured at its upper bail end portion to a lower length of chain 56 while the lower ends 60 of the arms 62 of the U-shaped bolts are upturned to retain a coil spring 64 which extends substantially throughout the length of the U-bolt. A rod 66, secured at its upper end to the upper end of the spring 64, as by means of a spring plate 68, extends downwardly through the coil spring for a short distance to project beyond the bolt. The stirrup 52 is connected to the end of the rod 66, as by means of a double J-hook 70. Thus the filter tube 28 is resiliently suspended from the structural support 54. The amount of tension in the suspension can be regulated by increasing or decreasing the length of the chain between the support 54 and the U-bolt 58, as by hooking a lower link to increase tension, or by hooking an upper link to decrease tension. The compressed coil spring 64 will operate to maintain the suspended filter tube under the desired tensioned relation.

The shaker mechanism comprises a crosswise extending, horizontally disposed structural member, such as an angle bar 72, which is suspended at its ends by an elongate suspension rod 74 hooked at its upper end on a bracket 76, fixed to the structural frame, and hooked at its lower end onto a bracket 78, such as a J-hook, fixed to the end of the angle bar 72. Thus the shaker bar is suspended in a manner to be retained at a constant level while permitting reciprocal movement in a linear direction responsive to operative engagement with a reciprocating actuating means.

One such means, illustrated in the drawing, comprises a power source in the form of an oscillating motor 36 having a shaft 80 onto which a rocker arm 82 is fixed while an offset portion of the rocker arm is provided with an elongate vertically disposed slot 83 through which a pin 84, rigid with the shaker bar 72, extends whereby the shaker bar is caused to oscillate in the endwise horizontal direction responsive to rocking movement of the arm 82.

Means are provided for transmission of such oscillating movement of the shaker bar 72 to the filter tubes without interfering with the vertical adjustment in the filter tube support. For this purpose, a retainer plate 86 is secured to the shaker bar in vertical alignment with each tube support. Each plate is formed with a central offset 88 to provide a vertically disposed passage between the plate and bar through which the central portion of the double hook 70 extends to enable vertical displacement relative to the bar while reciprocal horizontal swinging movement of the bar is transmitted directly to the double J-hook and from the latter to the filter tubes supported thereby.

In practice, the lower end of the filter tube 28 is releasably secured by the collar 40 to the cell plate. The upper end is hooked onto the double J-hook via the saddle 52 and the chain 56 is raised until the spring 64 is compressed to the point where the desired tensioned relation is established, and the chain is then hooked onto the support hook 54. The double J-hook is free to move vertically relative to the shaker bar to enable the described sequence of operations. Therefore, the spring operates to maintain the desired tensioned relation while the support is free to swing in response to reciprocal movement of the shaker bar 72 which is responsive to actuation by the oscillating motor during any cleaning cycle.

To remove a filter tube for repair or replacement, it is only necessary to unhook the chain 56 from the support bracket and lower the suspension assembly. This releases the spring tension to enable the double J-hook 70 to be disengaged from the saddle to free the filter tube.

It will be understood that changes may be made in the details of construction, arrangement and operation, without departing from the spirit of the invention, especially as defined in the following claims.

I claim:

1. In a filter mechanism which makes use of a filter housing in which a filter bag is anchored at its lower end and in which a shaker mechanism is operatively connected to an upper end portion of the filter bag for removal of filtered particles collected thereon, means for releasably mounting the filter bag within the housing in a manner to maintain the filter bag in a tensioned relation while providing means for transmitting actuation from the shaker mechanism to the bag comprising a shaker bar mounted for horizontal reciprocal shaking movement, a power source and means for operatively connecting the power source with the shaker bar for actuating the latter in reciprocal shaking movement, an elongate, vertically disposed resilient member, a fixed support, a linking member connected at its upper end portion to the support, a bolt connected at its lower end portion to a lower end portion of the resilient member and releasably connected at its upper end portion to a lower end portion of the linking member at a point above the resilient member, a rod connected at its upper end portion with the upper end portion of the resilient member and releasably connected at its lower end portion with the upper end portion of the filter bag via a hook member located below the resilient member, a retainer plate fixed to the shaker bar through which the hook member extends to enable endwise movement of the hook member relative to the bar while the said hook member moves with the bar during reciprocal movement of the bar, and the linking member being formed so as to permit its length to be variable for mounting the bag under tension.

2. A filter mechanism as claimed in claim 1 in which the shaker bar is horizontally disposed and suspended from rods secured at their upper end portion from supports rigid with the housing and connected at their lower end portion to the shaker bar to support the bar for reciprocal movement.

3. A filter mechanism as claimed in claim 2 in which the means for operatively connecting the power source with the shaker bar for actuation of the shaker bar in reciprocal movement comprises a reciprocating motor driven shaft, a rocker arm mounted on the shaft for reciprocal movement therewith, and a pin and slot connection between a portion of the rocker arm offset from the shaft and the shaker bar.

4. A filter mechanism as claimed in claim 1 in which the resilient member comprises an elongate tensioned spring.

5. A filter mechanism as claimed in claim 4 in which the bolt comprises a U-shaped member with means at the lower end portion to engage the lower end portion of the spring, and the linking member comprising a chain to which the upper end portion of the U-shaped member is connected.

6. A filter mechanism as claimed in claim 4 in which the rod comprises an elongate rod with the upper end portion connected to the upper end portion of the spring, and the hook member interconnects the lower end portion of the elongate rod and the upper end portion of the filter bag, the intermediate portion of the hook member extends through the bracket.

7. A filter mechanism as claimed in claim 1 in which the filter mechanism comprises a plurality of separately mounted filter bags and in which a retainer plate is provided on the shaker bar for each such mounting.

* * * * *